United States Patent
Muthaiah et al.

(10) Patent No.: US 11,585,234 B2
(45) Date of Patent: Feb. 21, 2023

(54) SYSTEMS, PROGRAM PRODUCTS, AND METHODS FOR DETECTING THERMAL STABILITY WITHIN GAS TURBINE SYSTEMS

(71) Applicant: General Electric Company, Schenectady, NY (US)

(72) Inventors: Veerappan Muthaiah, Bangalore (IN); Timothy Andrew Healy, Simpsonville, SC (US); Randy Scott Rosson, Simpsonville, SC (US); Harold Lamar Jordan, Jr., Greenville, SC (US); Kowshik Narayanaswamy, Bangalore (IN)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 16/809,134

(22) Filed: Mar. 4, 2020

(65) Prior Publication Data

US 2021/0277794 A1 Sep. 9, 2021

(51) Int. Cl.
*F01D 21/00* (2006.01)
*G05B 23/02* (2006.01)

(52) U.S. Cl.
CPC ....... *F01D 21/003* (2013.01); *G05B 23/0235* (2013.01); *G05B 23/0254* (2013.01);
(Continued)

(58) Field of Classification Search
CPC ........ F01D 21/003; F01D 11/14; F01D 21/04; F05D 2220/32; F05D 2260/80;
(Continued)

(56) References Cited

U.S. PATENT DOCUMENTS 3,911,286 A 10/1975 Uram
6,364,602 B1 4/2002 Andrew et al.
(Continued)

FOREIGN PATENT DOCUMENTS

EP 2407642 A2 1/2012
JP 5550790 B2 7/2014

OTHER PUBLICATIONS

Rowell, Review of First and Second Order System Response, MIT, 2004 (Year: 2004).*

(Continued)

*Primary Examiner* — Kyle R Quigley
(74) *Attorney, Agent, or Firm* — James Pemrick; Charlotte Wilson; Hoffman Warnick LLC

(57) ABSTRACT

Systems, program products, and methods for detecting thermal stability within gas turbine systems are disclosed. The systems may include a computing device(s) in communication with a gas turbine system, and a plurality of sensors positioned within or adjacent the gas turbine system. The sensor(s) may measure operational characteristics of the gas turbine system. The computing device(s) may be configured to detect thermal stability within the gas turbine system by performing processes including calculating a lag output for each of the plurality of measured operational characteristics. The calculated lag output may be based on a difference between a calculated lag for the measured operational characteristics and the measured operational characteristic itself. The calculated lag output may be also be based on a time constant for the measured operational characteristics. The computing device(s) may also determine when each of the calculated lag outputs are below a predetermined threshold.

17 Claims, 4 Drawing Sheets

(52) U.S. Cl.
CPC ...... *F05D 2220/32* (2013.01); *F05D 2260/80* (2013.01); *F05D 2260/83* (2013.01); *G05B 2219/41186* (2013.01)

(58) Field of Classification Search
CPC ...... F05D 2260/83; G05B 2219/41186; G05B 23/0235; G05B 23/0254
See application file for complete search history.

(56) References Cited

U.S. PATENT DOCUMENTS

| | | | |
|---|---|---|---|
| 6,535,824 B1 | 3/2003 | Mansky et al. | |
| 2001/0001845 A1* | 5/2001 | Khalid | F01D 21/04 701/100 |
| 2012/0016636 A1* | 1/2012 | John | F02C 9/54 702/182 |

OTHER PUBLICATIONS

EP Patent Application No. 21158002.2, European Search Report and Opinion dated Jul. 5, 2021, 10 pgs.

* cited by examiner

SYSTEMS, PROGRAM PRODUCTS, AND METHODS FOR DETECTING THERMAL STABILITY WITHIN GAS TURBINE SYSTEMS

BACKGROUND

The disclosure relates generally to gas turbine systems, and more particularly, to systems, program products, and methods for detecting thermal stability within gas turbine systems.

In conventional power systems, the operational parameters are continually monitored to ensure that the system is operating at a desired performance and/or at the highest operational efficiency. For example, various operational parameters within a gas turbine system are measured and/or monitored to determine if the gas turbine system is operating at the desired performance and/or generating the desired/required amount of power output. Such operational parameters may include fluid temperatures and/or pressures in various stages of the gas turbine system. In conventional systems, the operational parameters may be observed over time to determine or estimate operational statuses of the gas turbine system. For example, these operational parameters may be observed over time, such that when the operational parameters remain constant, an operator of the gas turbine system may assume that the system is thermally stable. Thermal stability in the gas turbine system may be crucial in operating the gas turbine system at a desired efficiency, especially for example when the system relies on and/or utilizes operational parameters for the thermal stable system in steady-state operational models. These operational models use the operational parameters to adjust the gas turbine system to increase and/or improve power output, operational efficiency, emissions outputs, and/or other similar characteristics.

However, in conventional systems operators may improperly assume operational statuses of the gas turbine system based solely on the operational parameters data. For example, operators may falsely conclude that the components of the gas turbine system are fully/completely thermally soaked and/or heated to an operational temperature based on no or minimal change to operational parameters data detected by the additional sensors. That is, it may be improperly determined that the gas turbine system is thermally stable, and thus may no longer operate in a "start-up" or "ramp-up" stage of operation, but rather should be operating in a "steady-state." As a result of this determination, operational parameters, such as flow volume, combustion temperatures, and/or fuel supply may increase to ensure that the system is generating the desired power output. However, prematurely moving to the "steady-state" operation where the gas turbine system is not thermally stable and/or the components of the systems are not completely heat soaked may in fact decrease the operational efficiency of the system, and/or may expose the components of the system to undesirable operational parameters (e.g., fluid temperatures). Exposure to the undesirable operational parameters may, for example, increase the risk of damage (e.g., creep) to the components of the gas turbine system.

SUMMARY

A first aspect of the disclosure provides a system including at least one computing device in communication with: a gas turbine system, and a plurality of sensors, at least one of the plurality of sensors positioned within or adjacent the gas turbine system, each sensor of the plurality of sensors measuring one of a plurality of operational characteristics of the gas turbine system, and wherein the at least one computing device is configured to detect thermal stability within the gas turbine system by performing processes including: calculating a lag output for each of the plurality of measured operational characteristics, the calculated lag output based on: a difference between a calculated lag for the measured operational characteristics of the gas turbine system and the measured operational characteristic, and a time constant for each of the plurality of measured operational characteristics; and determining when each of the calculated lag outputs are below a predetermined threshold, the predetermined threshold based on each of the plurality of measured operational characteristics and build parameters of the gas turbine system.

A second aspect of the disclosure provides a computer program product including program code, which when executed by at least one computing device, causes the at least one computing device to detect thermal stability within a gas turbine system, by performing processes including: calculating a lag output for each of a plurality of measured operational characteristics of the gas turbine system measured by a plurality of sensors positioned at least one of within or adjacent the gas turbine system, the calculated lag output based on: a difference between a calculated lag for the measured operational characteristics of the gas turbine system and the measured operational characteristic, and a time constant for each of the plurality of measured operational characteristics; and determining when each of the calculated lag outputs are below a predetermined threshold, the predetermined threshold based on each of the plurality of measured operational characteristics and build parameters of the gas turbine system.

A third aspect of the disclosure provides a method for detecting thermal stability within a gas turbine system, the method including: calculating a lag output for each of a plurality of measured operational characteristics of the gas turbine system measured by a plurality of sensors positioned at least one of within or adjacent the gas turbine system, the calculated lag output based on: a difference between a calculated lag for the measured operational characteristics of the gas turbine system and the measured operational characteristic, and a time constant for each of the plurality of measured operational characteristics; and determining when each of the calculated lag outputs are below a predetermined threshold, the predetermined threshold based on each of the plurality of measured operational characteristics and build parameters of the gas turbine system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
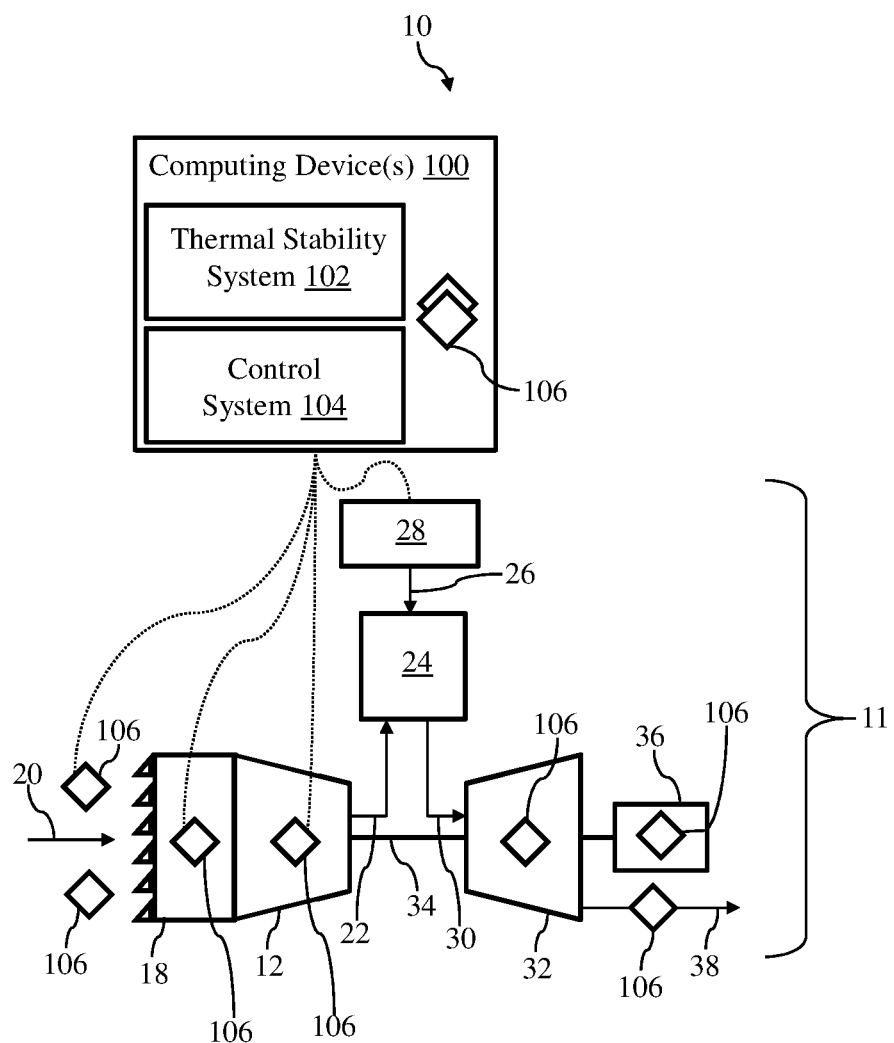
FIG. 1 shows a schematic depiction of a gas turbine system including a control system, according to various embodiments of the disclosure.

As an initial matter, in order to clearly describe the current disclosure it will become necessary to select certain terminology when referring to and describing relevant machine components within combined cycle power plants. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to gas turbine systems, and more particularly, to systems, program products, and methods for detecting thermal stability within gas turbine systems.

These and other embodiments are discussed below with reference to FIGS. 1-4. However, those skilled in the art will readily appreciate that the detailed description given herein with respect to these Figures is for explanatory purposes only and should not be construed as limiting.

FIG. 1 shows a schematic depiction of a system 10 including a gas turbine system 11 according to various embodiments of the disclosure. Gas turbine system 11 of system 10 may include a compressor 12 and a variable or adjustable inlet guide vane (IGV) 18 coupled or positioned on compressor 12 and/or positioned upstream of an inlet of compressor 12. Compressor 12 compresses an incoming flow of fluid 20 (e.g., air) that may flow through IGV 18 into compressor 12. As discussed herein, IGV 18 may regulate the mass flow or flow rate of fluid 20 as it flows through IGV 18 to compressor 12. Compressor 12 delivers a flow of compressed fluid 22 (e.g., compressed air) to a combustor 24. Combustor 24 mixes the flow of compressed fluid 22 with a pressurized flow of fuel 26 provided by a fuel supply 28 and ignites the mixture to create a flow of combustion gas 30.

The flow of combustion gas 30 is in turn delivered to a turbine component 32, which typically includes a plurality of turbine blades (not shown). The flow of combustion gas 30 drives turbine component 32 to produce mechanical work. The mechanical work produced in turbine component 32 drives compressor 12 via a shaft 34, and may be used to drive a generator 36 (e.g., external component) configured to generate power and/or produce a load. Combustion gas 30 flowed through and driving turbine blades of turbine component 32, may be exhausted from turbine component 32 via an exhaust housing or conduit 38 and released into the atmosphere or alternatively (re)used by another system (e.g., steam turbine system).

Although gas turbine system 11 is shown in FIG. 1 to include a single shaft configuration, it is understood that in other non-limiting examples, gas turbine system 11 may include a dual shaft or rotor configuration.

As shown in FIG. 1, system 10 may also include at least one computing device 100 operably coupled to and/or configured to detect thermal stability within gas turbine system 11, and/or adjust operational parameters of gas turbine system 11 based on the detected thermal stability. Computing device(s) 100 can be hard-wired and/or wirelessly connected to and/or in communication with gas turbine system 11, and its various components (e.g., compressor 12, IGV 18, turbine component 32, and so on) via any suitable electronic communication component or technique. As discussed herein, computing device(s) 100 may be in communication with the various components of gas turbine system 11 (not shown for clarity) to detect when gas turbine system 11 is thermally stable and/or determine when the operational features or components of gas turbine system 11 are heated to an operational temperature (e.g., fully heat soaked). In various embodiments, computing device(s) 100 can include a thermal stability system 102, a control system 104, and a plurality of sensors 106, as described herein, to obtain or measure operational characteristics for gas turbine system 11. As discussed herein thermal stability system 102 may be used to detect thermal stability within gas turbine system 11, while control system 104 may control/adjust operational parameters of gas turbine system 11, and its various components based on the detected thermal stability.

Computing device(s) 100 of system 10 may include and/or may be in electrical communication with a plurality of sensors 106. As shown in the non-limiting example of FIG. 1, at least one or a plurality of sensor(s) 106 (a portion shown in phantom) of and/or connected to computing device(s) 100 may be positioned in various locations within or adjacent gas turbine system 11 to measure, detect, and/or obtain operational characteristics of gas turbine system 11 during operation. As such, the positions of sensor(s) relative to gas turbine system 11, and/or the type/configuration of sensor(s) 106 may determine the operational characteristics measured or detected. For example, one of the plurality of sensors 106 may be positioned directly adjacent and/or upstream of compressor 12, and more specifically the inlet of compressor 12 including IGV 18. In this non-limiting example, this sensor 106 may be configured and/or formed from any suitable sensor that may measure, detect, or obtain the inlet temperature for fluid 20 flowing to compressor 12; commonly referred to as compressor inlet temperature. Additionally, or alternatively, distinct sensor(s) 106 positioned within inlet of compressor 12 including IGV 18 and/or directly within compressor 12 (and downstream of IGV 18) may also be positioned, configured, and/or formed from any suitable sensor that may measure, detect, or obtain the compressor inlet temperature based on fluid 20.

In the non-limiting example shown in FIG. 1, computing device 100 may include additional sensor(s) 106 positioned throughout gas turbine system 11. For example, a plurality of distinct sensor(s) 106 may be positioned within, adjacent, and/or in communication with turbine component 32, generator 36, exhaust conduit 38, supply lines between compressor 12/turbine component 32 and combustor 24 (not shown), shaft 34 (not shown), and so on. Each of these sensor(s) 106 may be positioned and/or configured to identify, detect, and/or measure additional or distinct operational characteristics for gas turbine system 11. The distinct operational characteristics may differ from the compressor inlet temperature based on fluid 20. Additionally, and as discussed herein, the distinct operational characteristics may be explicitly used to detect thermal stability for gas turbine system 11, and/or may be used to determine when the various components of gas turbine system 11 are heated to and/or maintained at an operational temperature (e.g., heat soaked). The operational characteristics may include, but are not limited to, the discharge temperature of the compressed fluid 22 flowing from compressor 12, exhaust temperatures for combustion gas 30 flowing through exhaust conduit 38, a power output for gas turbine system 11 based on, for example, operation of generator 36, a position of IGV 18 (e.g., angle or degree of openness), a field stroke reference or fuel flow for the fuel of the gas turbine supplied by fuel supply 28, a fuel flow rate for gas turbine system 11 as supplied by fuel supply 28, and so on.

Although seven sensors 106 are shown, it is understood that in other non-limiting examples, system 10 may include more or less sensors 106 that may be configured to provide computing device(s) 100, and specifically thermal stability system 102 and control system 104, with information or data relating operational characteristics for gas turbine system 11 during operation.

In a non-limiting example, sensor(s) 106 may intermittently sense, detect, and/or obtain data relating to the operational characteristic(s) for gas turbine system 11 during operation. The intermittent interval or period in which sensor(s) obtain the data may be determined by, for example, operational hours for gas turbine system 11, operational life of gas turbine system 11, operational status (e.g., start-up, steady-state), the type of data being obtained by the sensor(s) 106, and the like. In another non-limiting example, sensor(s) 106 may continuously sense, detect, and/or obtain data relating to the operational characteristic(s) for gas turbine system 11 during operation. Furthermore, it is understood that sensors 106 shown in gas turbine system 11 may already be present and included within gas turbine system 11. As such, no new sensors may need to be added to gas turbine system 11 in order for computing device(s) 100 to detect when gas turbine system 11 is thermally stable, as discussed herein.

As discussed herein, computing device 100, and more specifically thermal stability system 102 of computing device 100, may detect when gas turbine system 11 is thermally stable. Thermal stability system 102 may utilize the operational characteristic(s) for gas turbine system 11, as measured by sensors 106 of computing device 100, to detect when gas turbine system 11 is thermally stable and/or determine when the operational features or components of gas turbine system 11 are heated to an operational temperature (e.g., fully heat soaked). In order to detect thermal stability within gas turbine system 11, thermal stability system 102 may utilize the measured operational characteristics in a series of calculations. In one non-limiting example, thermal stability system 102 may detect and/or determine that gas turbine system 11 is thermally stable in response to a single lag output associated and/or corresponding to a single measured operational characteristic being below a predetermined threshold for the measured operational characteristic, as discussed herein. In another non-limiting example, and as discussed herein, thermal stability system 102 may detect and/or determine that gas turbine system 11 is thermally stable in response to each and/or all lag outputs associated and/or corresponding to each measured operational characteristic being below a predetermined threshold for the measured operational characteristic. That is, thermal stability for gas turbine system 11 may only be detected by thermal stability system 102 once all calculated lag outputs corresponding to each of the plurality of measured operational characteristics is below a predetermined threshold.

In a non-limiting example, once sensors 106 detect, determine, obtain, and/or measure the operational characteristics of gas turbine system 11, thermal stability system 102 may use the measured operational characteristics to calculate a lag or lag function (hereafter, "lag" or "calculated lag") for each of the measured operational characteristics. The calculated lag may be based on each of the plurality of measured operational characteristics and build parameters (e.g., compressor/combustor/turbine component-type/size/model, etc.) of the gas turbine system 11. For example, the lag for each of the plurality of measured operational characteristics of gas turbine system 11 may be calculated based on:

$$OC_{lag}(t) = OC_{lag}(t-1) + (OC_{measured}(t-1) - OC_{lag}(t-1))\left(1 - e^{\left(\frac{-\Delta t}{\tau_{OC}}\right)}\right)$$

where t is a first time, t−1 is a second time occurring prior to the first time t, $OC_{lag}(t)$ is the calculated lag for the measured operational characteristic at time t, $OC_{lag}(t-1)$ is the calculated lag for the measured operational characteristic at time t−1, $OC_{measured}(t-1)$ is the measured operational characteristic at time t−1, $\Delta t$ is the difference between the first time and the second time, and $\tau_{OC}$ is the time constant of the measured operational characteristic. In the non-limiting example, the calculation for determining lag for the measured operational characteristic may be based, at least in part, on a first order, unsteady state heat transfer condition used to determine or solve for a temperature inside a heat-conducting material. Additionally, the time constant ($\tau_{OC}$) may be specific to the measured operational characteristic. For example, the time constant for the compressor inlet temperature (e.g., $\tau_{CTIM}$) may be distinct from the time constant for the position of IGV 18 (e.g., $\tau_{IGVP}$). Furthermore, the time constant (e.g., $\tau_{OC}$) may be specific to the build parameters for gas turbine system 11. That is, the time constant for the compressor inlet temperature (e.g., $\tau_{CTIM}$) may vary from system to system and/or may be dependent upon the build parameters (e.g., type, size, model, etc.) from compressor 12 of gas turbine system 11. As such, a distinct gas turbine system having a different type/size/model compressor than that of compressor 12 of gas turbine system 11 may also include a distinct time constant for the compressor inlet temperature (e.g., $\tau_{CTIM}$).

Once the lag (e.g., $OC_{lag}(t)$) for each of the measured operational characteristics is calculated, thermal stability system 102 may than determine a difference between the calculated lag for each of the measured operational characteristics for gas turbine system 11 and the measured operational characteristics. More specifically, thermal stability system 102 may determine an absolute difference between each of the operational characteristics, as measured by sensors 106, and the calculated lag for each of the measured operational characteristics. In a non-limiting example the absolute difference or lag difference may be based on:

$$\Delta OC_{lag} = OC_{measured} - OC_{lag}$$

where $\Delta OC_{lag}$ is this absolute difference, $OC_{measured}$ is data for the operational characteristic measured by sensors 106, and $OC_{lag}$ is the calculated lag for the measured operational characteristic.

After calculating the absolute difference (e.g., $\Delta OC_{lag}$), a final, lag output for each of the plurality of measured operational characteristics may be determined. More specifically, thermal stability system 102 may determine or calculate a lag output for each of the plurality of operational characteristics that may be measured by sensors 106 of computing device(s) 100. The calculated lag output for each of the measured operational characteristics may be based on the calculated/determined absolute difference (e.g., $\Delta OC_{lag}$) between the calculated lag of each measured operational characteristic and the time constant for each of the measured operational characteristics. That is, lag output may be calculated based on the difference between each of the operational characteristics as measured by sensors 106 (e.g., $OC_{measured}$), and the calculated lag (e.g., $OC_{lag}$) for each of the measured operational characteristics, as well as the time constant (e.g., $\tau_{OC}$) for each of the plurality of measured operational characteristics. As such, the lag output for each of the plurality of measured operational characteristics of gas turbine system 11 may be calculated based on:

$$O\dot{}C_{lag} = \frac{\Delta OC_{lag}}{\tau_{OC}}$$

where $O\dot{}_{lag}$ is the calculated lag output, $\Delta OC_{lag}$ is the determined lag difference, and $\tau_{OC}$ is the time constant of the measured operational characteristic. In the non-limiting example, the calculated lag output (e.g., $O\dot{}_{lag}$) may be a first order derivative of the input for each of the measured operational characteristics (e.g., $OC_{lag}$).

Having the calculated output, thermal stability system 102 may detect when gas turbine system 11 is thermally stable. More specifically, using the calculated lag output (e.g., $O\dot{}_{lag}$) for each of the plurality of measured operational characteristics, thermal stability system 102 of computing device(s) 100 may determine, detect, and/or identify when gas turbine system 11 is thermally stable, and/or may determine when the various components of gas turbine system 11 are heated to and/or maintained at an operational temperature (e.g., heat soaked). In a non-limiting example, thermal stability system 102 may determine or detect thermal stability within gas turbine system 11 by comparing the calculated lag output (e.g., $O\dot{}_{lag}$) for each of the plurality of measured operational characteristics to a predetermined threshold. The predetermined threshold may be based on each of the plurality of measured operational characteristics as measured by sensors 106, as well as build parameters (e.g., compressor/combustor/turbine component-type/size/model, etc.) of gas turbine system 11. For example, the predetermined threshold may be specific to each of the plurality of measured operational characteristics, and may be determined, defined, and/or calculated for each of the plurality of measured operational characteristics based on an operational model of gas turbine system 11. The operational model of gas turbine system 11 may be based, at least in part, on an ideal, optimized, uninhibited, and/or "new-and-clean system" performance or operation for a model that is identical (e.g., identical build parameters, identical compressor/combustor/turbine component-type, etc.) as gas turbine system 11. That is, the operational model includes build parameters that are identical to those build parameters of gas turbine system 11 to model the ideal scenarios of operation for gas turbine system 11. As such, the operational model of gas turbine system 11 may be used to calculate and/or generate the predetermined threshold for each of the operational characteristics measured by sensors 106. The predetermined threshold for each of the operational characteristics, as calculated by the operational model of gas turbine system 11, may provide a value for the operational characteristic that indicates gas turbine system 11 is thermally stable, as discussed herein.

Using the predetermined threshold calculated by thermal stability system 102, based on the operational model of gas turbine system 11, thermal stability system 102 may detect when gas turbine system 11 is thermally stable. For example, thermal stability system 102 may be determined, verified, and/or confirmed when each of the calculated lag outputs (e.g., $O\dot{}_{lag}$) for the plurality of measured operational characteristics are below a corresponding predetermined threshold. When thermal stability system 102 determines that all calculated lag outputs (e.g., $O\dot{}_{lag}$) are below the predetermined threshold, gas turbine system 11 may be thermally stable. That is, thermal stability system 102 may verify and/or confirm gas turbine system 11 is thermally stable and/or all components of gas turbine system are heated to an operational temperature (e.g., heat soaked) in response to each of the calculated lag outputs for each of the plurality of measured operational characteristics being blow the corresponding predetermined threshold.

In determining, verifying, and/or confirming that gas turbine system 11 is thermally stable, additional processes may be performed on gas turbine system 11. For example, in response to determining each of the calculated lag outputs are below the corresponding predetermined thresholds, and ultimately gas turbine system 11 is thermally stable, operational conditions and/or parameters of gas turbine system 11 may be adjusted. Specifically, control system 104 of computing device(s) 100 may adjust operational conditions and/or parameters of gas turbine system 11 to, for example, increase power output for gas turbine system 11. In a non-limiting example, control system 104 may aid in increasing power output for gas turbine system 11 by adjusting the speed of shaft 34 and/or adjusting the position of IGV 18 (e.g., operational conditions) to alter the amount of fluid 20 introduced and/or compressed by compressor 12 the gas turbine system 11. In other non-limiting examples, once it is determined that gas turbine system 11 is thermally stable and/or the components included therein are heated to an operational temperature (e.g., heat soaked), computing device 100 may perform additional diagnostic and/or operational monitoring processes on gas turbine system 11. That is, once it determined that gas turbine system 11 is thermally stable, it is understood that additional measuring and/or calculations of operational characteristics for gas turbine system 11 may be accurate and/or precise, as compared to measurements/calculations that may be determined when gas turbine system 11 is thermally unstable. As such, operators of gas turbine system 11 may more accurately monitor the operations of gas turbine system 11 based on the detected thermal stability of the system as discussed herein.

Figure 2:
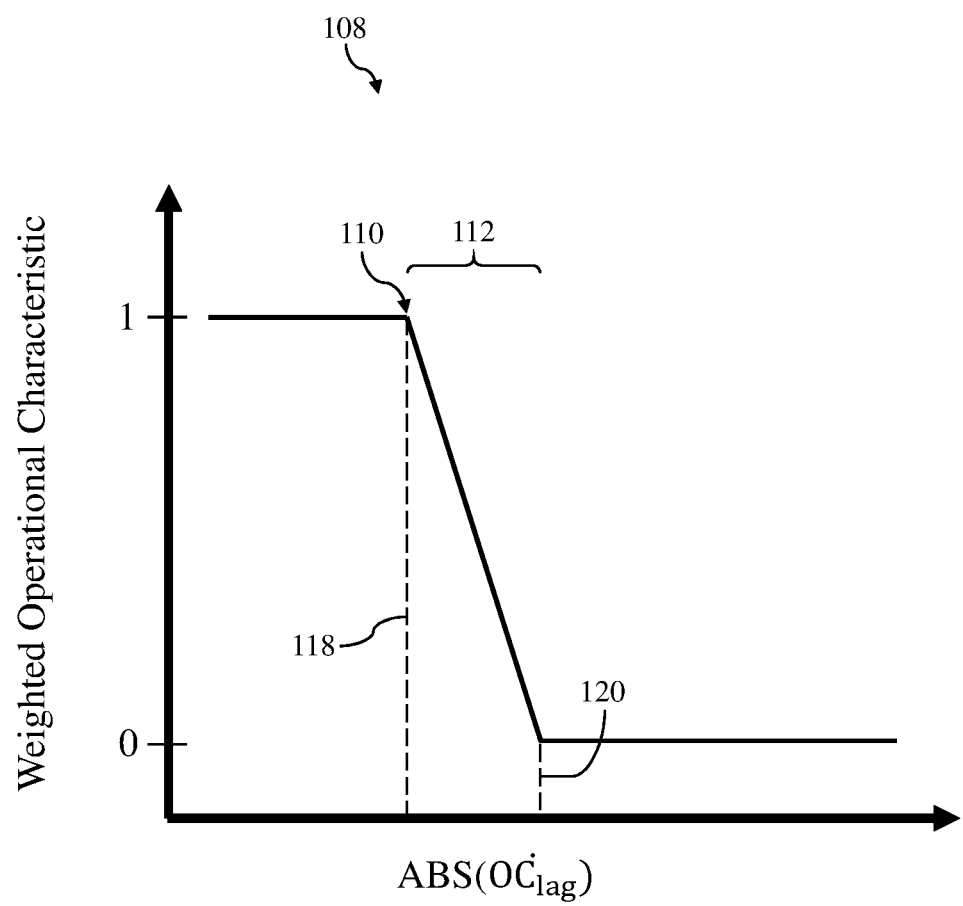
FIG. 2 shows a stability activation function graph of a lag output for an operational characteristic of a gas turbine system, according to embodiments of the disclosure.

Turning to FIG. 2, with continued reference to FIG. 1, a non-limiting example of a stability activation function graph 108 (hereafter, "graph 108") used by thermal stability system 102 of computing device(s) 100 (see, FIG. 1). In the non-limiting example, graph 108 may represent a non-limiting example in which thermal stability system 102 converts the calculated lag outputs (e.g., $O_{lag}$) for the plurality of measured operational characteristics into an absolute value (e.g., (0,1)) for determining when the calculated lag outputs are below the predetermined threshold, and in turn detects when gas turbine system 11 (see, FIG. 1) is thermally stable. In the non-limiting example, the predetermined threshold 110 may represent the value for the operational characteristic that indicates gas turbine system 11 is thermally stable, as discussed herein. Specifically, and as discussed herein, when the calculated lag outputs (e.g., $O_{lag}$) for the measured operational characteristic is below predetermined threshold 110, thermal stability system 102 may indicate or detect that gas turbine system 11 is thermally stable.

In another non-limiting example, and as shown in FIG. 2, thermal stability system 102 may also identify a range 112 as defined by reference lines 118, 120 in graph 108. Range 112 may define a portion of calculated lag outputs (e.g., $O_{lag}$) for the measured operational characteristic that may be below predetermined threshold 110, but may not necessarily ensure and/or guarantee thermal stability within gas turbine system 11. That is, range 112 may include calculated lag outputs (e.g., $O_{lag}$) for the measured operational characteristic that may be below predetermined threshold 110, but may not necessarily ensure that gas turbine system 11 is thermally stable. The size and/or values of range 112 may be dependent, at least in part, on the operational characteristics measured and/or information relating to sensors 106 used to measure the operational characteristics. For example, range 112 may be dependent, at least in part, on a predetermined or known uncertainty for sensors 106. Specifically, sensors 106 may include a predetermined uncertainty, sensitivity, and/or data detection deviation based on operation and/or manufacturing variables. As such, an operator or user of gas turbine system 11 and computing device(s) 100 may understand that the data values associated with measured operational characteristics may be skewed based on the known uncertainty for the sensors. To ensure gas turbine system 11 is thermally stable, thermal stability system 102 may use the predetermined uncertainty of sensors 106 to establish range 112. In the non-limiting example, once the calculated lag outputs (e.g., $O_{lag}$) for the measured operational characteristic is below predetermined threshold 110, and outside of range 112, thermal stability system 102 may detect that gas turbine system 11 is thermally stable and/or the components of gas turbine system 11 are heated to the operational temperature (e.g., heat soaked).

Figure 3:
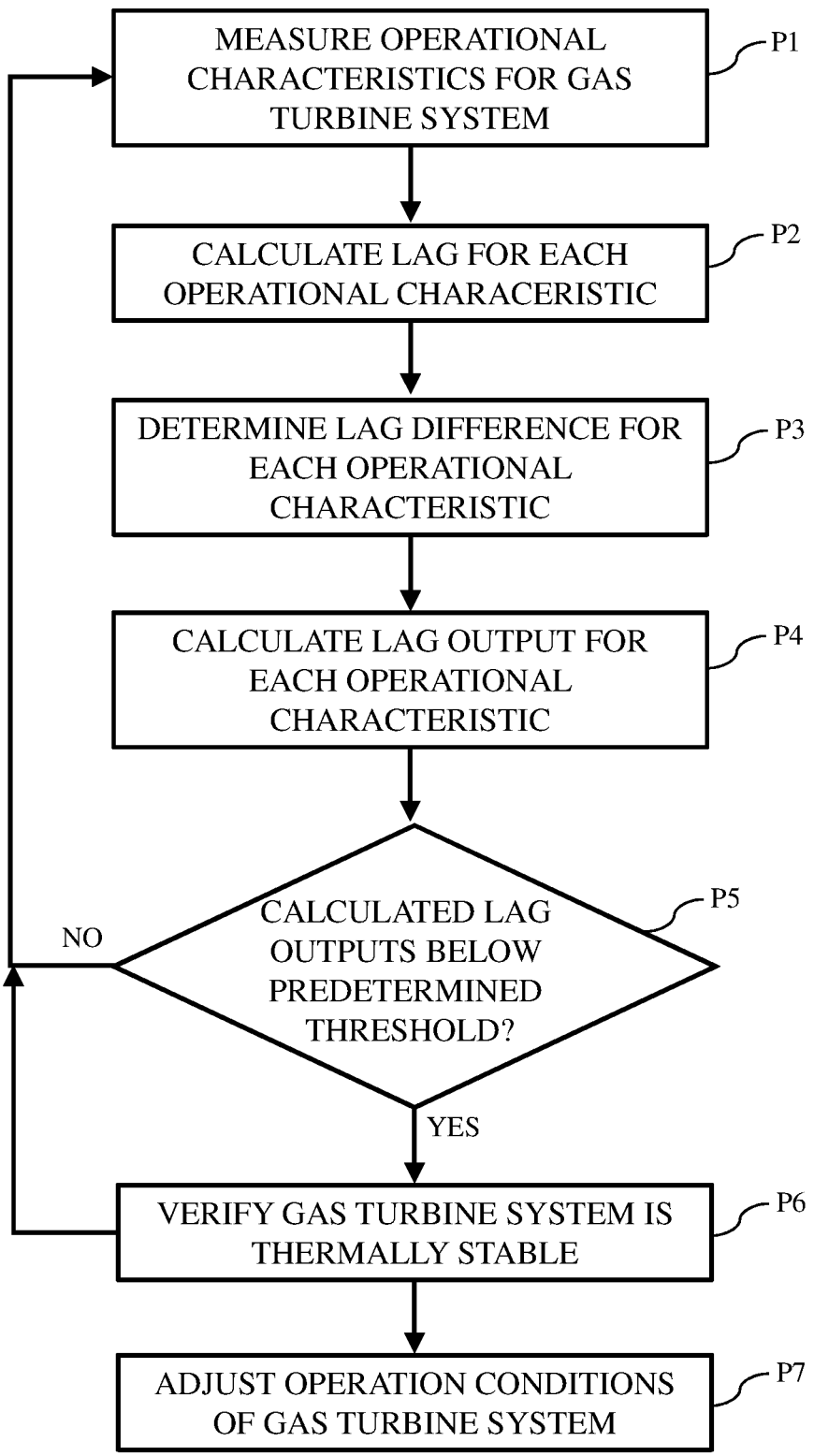
FIG. 3 shows example processes for detecting thermal stability of the gas turbine system of FIG. 1, according to embodiments of the disclosure.

FIG. 3 shows a flow diagram illustrating non-limiting example processes for detecting when gas turbine system 11 is thermally stable. These processes can be performed, e.g., by at least one computing device 100 including thermal stability system 102 and control system 104 (see, FIG. 1), as described herein. In other cases, these processes can be performed according to a computer-implemented method for detecting thermal stability within gas turbine system 11. In still other embodiments, these processes can be performed by executing computer program code on computing device(s) 100, causing computing device(s) 100, and specifically thermal stability system 102 and control system 104, to detect when gas turbine system 11 is thermally stable.

In process P1, operational characteristic(s) for a gas turbine system may be measured. More specifically, a plurality of operational characteristics for the gas turbine system may be measured using a plurality of sensors positioned adjacent and/or within the gas turbine system. The measured operational characteristics may include, but are not limited to, the compressor inlet temperature for fluid flowing to a compressor of the gas turbine system, the discharge temperature of the compressed fluid flowing from the compressor, exhaust temperatures for the combustion gas flowing through the exhaust conduit of the gas turbine system, a power output for the gas turbine system based on, for example, operation of a generator(s), a position of the IGV (e.g., angle or degree of openness), a field stroke reference for the fuel of the gas turbine supplied by a fuel supply, a fuel flow rate for the gas turbine system as supplied by the fuel supply, and so on.

In process P2, a lag is calculated for each of the plurality of measured operational characteristics. That is, a lag or lag function for each of the plurality of operational characteristics measured in process P1 is calculated. The calculated lag may be based on each of the plurality of measured operational characteristics and build parameters (e.g., compressor/combustor/turbine component-type/size/model, etc.) of the gas turbine system. Additionally, the calculated lag may be based on a time constant for reach each of the plurality of measured operational characteristics. In a non-limiting example, the calculation for determining lag for each measured operational characteristic may be based, at least in part, on a first order, unsteady state heat transfer condition used to determine or solve for a temperature inside a heat-conducting material. The time constant may be specific to the measured operational characteristic. That is, the lag for each of the plurality of measured operational characteristics may be calculated by a time constant that is specific to and/or corresponds to the individual, measured operational characteristic. Furthermore, the time constant may be specific to the build parameters for the gas turbine system. That is, the time constant for an operational characteristic (e.g., compressor inlet temperature) may vary from system to system and/or may be dependent upon the build parameters (e.g., type, size, model, etc.) from the compressor of the gas turbine system.

In process P3, a lag difference may be determined. More specifically, a lag difference for each of the plurality of measured operational characteristics for the gas turbine system may be determined, calculated, and/or identified. The lag difference may include a difference between the calculated lag for each of the measured operational characteristics for the gas turbine system (e.g., process P2) and the corresponding, measured operational characteristics (e.g., process P1). In a non-limiting example, the determined lag difference may be an absolute value difference between each of the measured operational characteristics and the calculated lag for each of the measured operational characteristics.

In process P4 a lag output may be calculated. That is, a lag output for each of the plurality of measured operational characteristics may be calculated or determined. The calculated lag output for each of the measured operational characteristics may be based on the calculated/determined (absolute) difference between the calculated lag of each measured operational characteristic (e.g., process P3) and the time constant for each of the measured operational characteristics. That is, the lag output may be calculated based on the difference between each of the operational characteristics as measured by the sensors, and the calculated lag for each of the measured operational characteristics, as well as the time constant for each of the plurality of operational characteristics. The calculated lag difference may be divided by the time constant for the corresponding operation characteristic to calculate the lag output. In a non-limiting example, the calculated lag output may be a first order derivative of the input for each of the measured operational characteristics (e.g., process P2).

In process P5 it may be determined if the calculated lag output (e.g., process P4) is below a predetermined threshold. Specifically, it may be determined if the calculated lag outputs for each of the plurality of measured operational characteristics are below a corresponding predetermined threshold by comparing each calculated lag output to predetermined thresholds. The predetermined threshold may be based on each of the plurality of measured operational characteristics as measured by the sensors in process P1, as well as build parameters (e.g., compressor/combustor/turbine component-type/size/model, etc.) of the gas turbine system. For example, the predetermined threshold may be specific to each of the plurality of measured operational characteristics, and may be determined, defined, and/or calculated for each of the plurality of measured operational characteristics based on an operational model of the gas turbine system. The operational model includes build parameters that are identical to those build parameters of the gas turbine system to model the ideal scenarios of operation for the gas turbine system. As such, the operational model of the gas turbine system may be used to calculate and/or generate the predetermined threshold for each of the measured operational characteristics. The predetermined threshold for each of the operational characteristics may provide a value for the operational characteristic that indicates the gas turbine system is thermally stable, as discussed herein.

In response to determining that the calculated lag for each and/or one of the plurality of measured operational characteristics is not below the corresponding predetermined threshold (e.g., "NO" at P5), processes P1-P5 may be repeated. That is, if it is determined that the calculated lag for each and/or one of the plurality of measured operational characteristics is not below the corresponding predetermined threshold (e.g., "NO" at P5), than it cannot be verified that the gas turbine system is thermally stable (e.g., process P6), and the processes P1-P5 may be repeated until it can be verified that the gas turbine system is thermally stable.

However, in response to determining that the calculated lag for each of the plurality of measured operational characteristics is below the corresponding predetermined threshold (e.g., "YES" at P5), it may be verified in process P6 that the gas turbine system is thermally stable. That is in process P6, it may be verified or confirmed that the gas turbine system is thermally stable in response to each of the calculated lag outputs for each of the plurality of measured operational characteristics being below the corresponding predetermined threshold. Verifying the gas turbine system is thermally stable may also indicate that all components of the gas turbine system are heated to an operational temperature (e.g., heat soaked).

Subsequent to verifying that the gas turbine system is thermally stable in process P6, additional processes may be performed on the thermally stable, gas turbine system. For example, in response to determining each of the calculated lag outputs are below the corresponding predetermined thresholds, and ultimately verifying that the gas turbine system is thermally stable, operational conditions and/or parameters of the gas turbine system may be adjusted in process P7. Specifically, operational conditions and/or parameters of the gas turbine system may be adjusted to, for example, increase power output for the gas turbine system. In a non-limiting example, the power output for the gas turbine system may be increased by adjusting the speed of the shaft within the system and/or adjusting the position of the IGV (e.g., operational conditions) to alter the amount of fluid introduced and/or compressed by the compressor the gas turbine system.

In other non-limiting examples, once it is verified that the gas turbine system is thermally stable and/or the components included therein are heated to an operational temperature (e.g., heat soaked) (e.g., process P6), additional diagnostic and/or operational monitoring processes may be performed on the gas turbine system. That is, once it verified that the gas turbine system is thermally stable, it is understood that additional measuring and/or calculations of the operational characteristics for the gas turbine system may be accurate and/or precise, as compared to measurements/calculations that may be determined when the gas turbine system is thermally unstable (e.g., start-up). As such, operators of the gas turbine system may perform the additional diagnostic and/or operational monitoring processes on the gas turbine system to more accurately monitor the operations of the system based on the detected thermal stability.

Additionally as shown in FIG. 3, it is understood that processes P1-P6 may be performed continuously and/or at predetermined cycles. Processes P1-P6 may be performed continuously and/or at predetermined cycles such that the thermal stability of the gas turbine system may always or intermittently be known during operation. As such, even when it is determined that the calculated lag output is below the predetermined threshold (e.g., "YES" at process P5) and it is verified that the gas turbine system is thermally stable (e.g., process P6), processes P1-P6 may be subsequently performed again, either immediately or after a predetermined period time, in order to continue to verify that the gas turbine system is still and/or remains thermally stable.

It is to be understood that in the flow diagrams shown and described herein, other processes or operations, while not being shown, may be performed. The order of processes may also be rearranged according to various embodiments. For example, although shown as being performed in succession, processes P6 and P7 may be performed simultaneously. Furthermore, the processes P1-P7 may be performed continuously in succession and/or process P1 may be performed continuously or intermittently, independent of performing the other processes, to improve operation of a gas turbine system and/or aid in detecting or determining thermal stability within the gas turbine system, as discussed herein. The flow of processes shown and described herein is not to be construed as being limited to the various embodiments.

Figure 4:
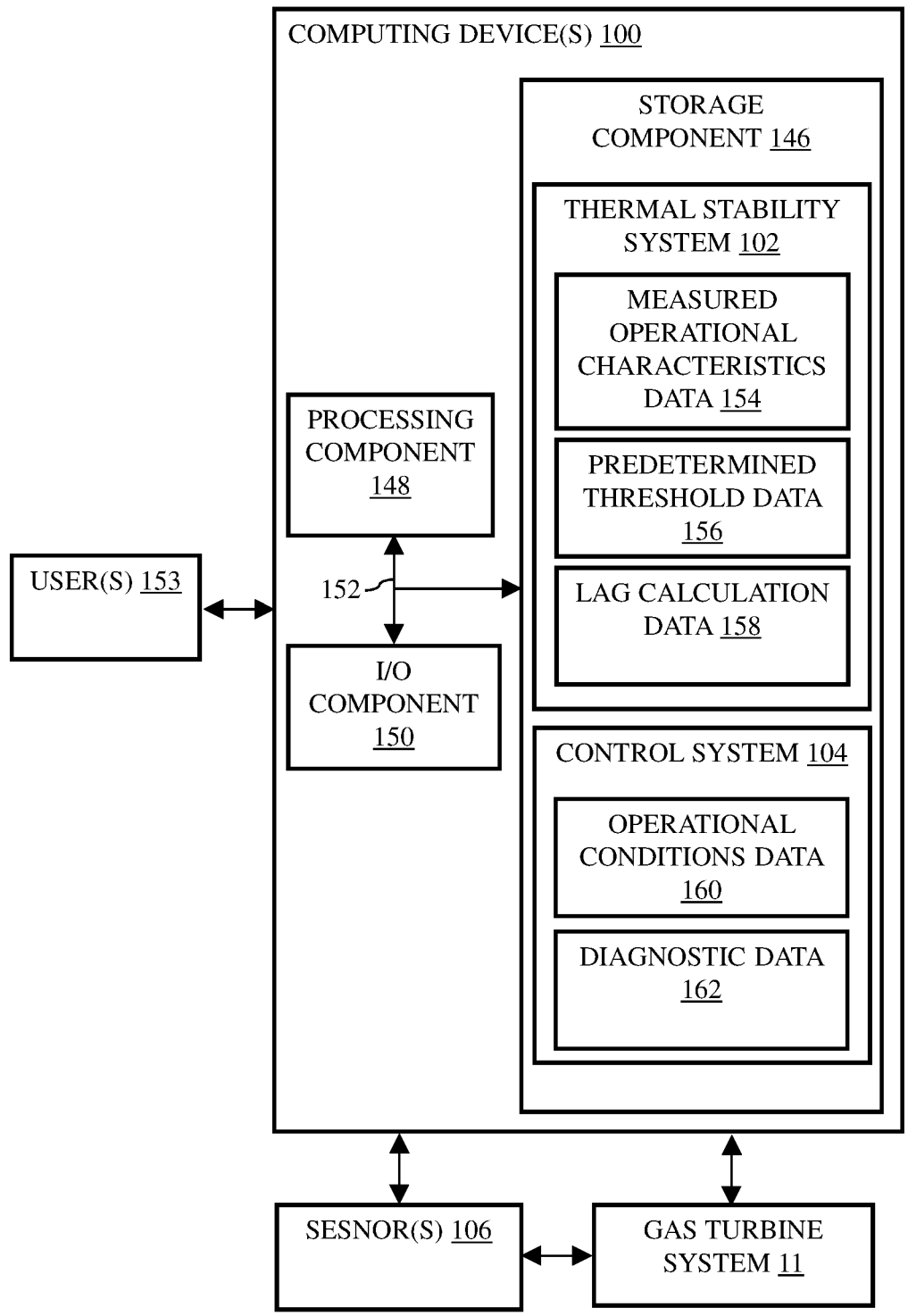
FIG. 4 shows an environment including a control system for thermal stability of the gas turbine system of FIG. 1, according to embodiments of the disclosure.

FIG. 4 shows an illustrative environment. To this extent, the environment includes computing device(s) 100 that can perform the various process steps described herein for detecting thermal stability within gas turbine system 11. In particular, computing device(s) 100 is shown including thermal stability system 102 and control system 104, which enables computing device(s) 100 to detect thermal stability within gas turbine system 11 and control operation and/or adjusting operational conditions of gas turbine system 11 by performing one or more of the process steps of the disclosure.

Computing device(s) 100 is shown including a storage component 146, a processing component 148, an input/output (I/O) component 150, and a bus 152. Further, computing device(s) 100 is shown in communication with gas turbine system 11 and/or sensors 106. As is known in the art, in general, processing component 148 executes computer program code, such as thermal stability system 102 and control system 104, that is stored in storage component 146 or an external storage component (not shown). While executing computer program code, processing component 148 can read and/or write data, such as thermal stability system 102 and control system 104, to/from storage component 146 and/or I/O component 150. Bus 152 provides a communications link between each of the components in computing device(s) 100. I/O component 150 can comprise any device that enables a user(s) 153 to interact with computing device(s) 100 or any device that enables computing device(s) 100 to communicate with one or more other computing devices. Input/output devices (including but not limited to keyboards, displays, pointing devices, etc.) can be coupled to the system either directly or through intervening I/O controllers.

In any event, computing device(s) 100 can comprise any general purpose computing article of manufacture capable of executing computer program code installed by a user 153 (e.g., a personal computer, server, handheld device, etc.). However, it is understood that computing device(s) 100 and thermal stability system 102/control system 104 are only representative of various possible equivalent computing devices that may perform the various process steps of the disclosure. To this extent, in other embodiments, computing device(s) 100 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computing device(s) 100 is only illustrative of various types of computer infrastructures for implementing the disclosure. For example, in one embodiment, computing device(s) 100 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, thermal stability system 102 enables computing device(s) 100 to detect when gas turbine system 11 is thermally stable, while control system 104 enables computing device(s) 100 to control operations and/or adjust operational conditions of gas turbine system 11. To this extent, each of thermal stability system 102 and control system 104 are shown including various modules including, measured operational characteristics data 154, predetermined threshold data 156, lag calculation data 158 including calculations relating to the lag, the lag difference and the lag output, operational conditions data 160, and diagnostic data 162. Operation of each of these data is discussed further herein. However, it is understood that some of the various data shown in FIG. 4 can be implemented independently, combined, and/or stored in memory for one or more separate computing devices that are included in computing device(s) 100. Further, it is understood that some of the data and/or functionality may not be implemented, or additional data and/or functionality may be included as part of computing device(s) 100.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining/measured operational characteristic(s), etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Technical effect is to provide a system, program product, and method for detecting when a gas turbine system is thermally stable. Specifically, the system may use measured operational characteristics for the gas turbine system to detect thermal stability for the gas turbine systems, and/or may be used to determine when the various components of the gas turbine systems are heated to and/or maintained at an operational temperature (e.g., heat soaked). Being able to determine when gas turbine systems are thermally stable may allow operators to obtain accurate performance information for the gas turbine systems and/or adjust operational characteristics or parameters to improve efficiencies of the gas turbine system (e.g., increase power output).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims herein are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system, comprising:
    at least one computing device in communication with:
        a gas turbine system, the gas turbine system including a compressor, a combustor, and a turbine component, and
        a plurality of sensors, at least one of the plurality of sensors positioned within or adjacent the gas turbine system, each sensor of the plurality of sensors measuring one of a plurality of operational characteristics of the gas turbine system, and
    wherein the at least one computing device is configured to detect thermal stability within the gas turbine system by performing processes including:
        calculating a lag output for each of the plurality of measured operational characteristics, the calculated lag output based on:
            a difference between a calculated lag for the measured operational characteristics of the gas turbine system and the measured operational characteristic, and
            a time constant for each of the plurality of measured operational characteristics; and
        determining when each of the calculated lag outputs are below a predetermined threshold, the predetermined threshold based on each of the plurality of measured operational characteristics and build parameters of the gas turbine system, wherein the build parameters include at least one of:
    a) at least one of a type, size, and model of the compressor;
    b) at least one of a type, size, and model of the combustor; and
    c) at least one of a type, size, and model of the turbine component,
        wherein the lag for each of the plurality of measured operational characteristics of the gas turbine system is calculated based on:

$$\left(\frac{\Delta t}{\tau_{OC}}\right)$$

wherein:
    t is a first time;
    t−1 is a second time occurring prior to the first time t;
    $OC_{lag}(t)$ is the calculated lag for the measured operational characteristic at time t;
    $OC_{lag}(t-1)$ is the calculated lag for the measured operational characteristic at time t−1;
    $OC_{measured}(t-1)$ is the measured operational characteristic at time t−1;
    Δt is the difference between the first time and the second time; and
    $\tau_{OC}$ is the time constant of the measured operational characteristic.

2. The system of claim 1, wherein the processes performed by the at least one computing device to detect thermal stability within the gas turbine system further include:
    verifying that the gas turbine system is thermally stable in response to each of the calculated lag outputs for each of the plurality of measured operational characteristics being below the corresponding predetermined threshold.

3. The system of claim 1, wherein the plurality of measured operational characteristics are selected from the group consisting of:
    a compressor inlet temperature;
    a compressor discharge temperature;
    an exhaust temperature of the gas turbine system;
    a power output for the gas turbine system;
    an inlet guide vane position;
    a field stroke reference for a fuel of the gas turbine system; and
    a fuel flow rate for the gas turbine system.

4. The system of claim 1, wherein the lag output for each of the plurality of measured operational characteristics of the gas turbine system is calculated based on:

$$O\_C_{lag} = \frac{\Delta OC_{lag}}{\tau_{OC}}$$

wherein:
    $O\_C_{lag}$ is the calculated lag output;
    $\Delta OC_{lag}$ is the determined lag difference; and
    $\tau_{OC}$ is the time constant of the measured operational characteristic.

5. The system of claim 1, wherein the processes performed by the at least one computing device to detect thermal stability within the gas turbine system further include:
    in response to determining each of the calculated lag outputs are below the corresponding predetermined threshold, adjusting operational conditions of the gas turbine system to increase a power output for the gas turbine system.

6. The system of claim 1, wherein the processes performed by the at least one computing device to detect thermal stability within the gas turbine system further include:
    calculating the predetermined threshold for each of the plurality of measured operational characteristics based on an operational model of the gas turbine system, the operational model of the gas turbine system includes identical build parameters as the build parameters of the gas turbine system.

7. The system of claim 1, wherein the time constant is specific to each of the plurality of measured operational characteristics and the build parameters for the gas turbine system.

8. A non-transitory computer-readable medium storing program code, which when executed by at least one computing device, causes the at least one computing device to detect thermal stability within a gas turbine system, by performing processes including:

measuring a plurality of operational characteristics of the gas turbine system, the operational characteristics measured by a plurality of sensors positioned at least one of within or adjacent the gas turbine system, the gas turbine system including a compressor, a combustor, and a turbine component;

calculating a lag output for each of the plurality of measured operational characteristics of the gas turbine system measured by the plurality of sensors positioned at least one of within or adjacent the gas turbine system, the calculated lag output based on:

a difference between a calculated lag for the measured operational characteristics of the gas turbine system and the measured operational characteristic, and a time constant for each of the plurality of measured operational characteristics; and determining when each of the calculated lag outputs are below a predetermined threshold, the predetermined threshold based on each of the plurality of measured operational characteristics and build parameters of the gas turbine system, wherein the build parameters include at least one of:

a) at least one of a type, size, and model of the compressor;

b) at least one of a type, size, and model of the combustor; and c) at least one of a type, size, and model of the turbine component, wherein the lag for each of the plurality of measured operational characteristics of the gas turbine system is calculated based on:

$$\left(\frac{\Delta t}{\tau_{OC}}\right)$$

wherein:

t is a first time;

t−1 is a second time occurring prior to the first time t;

$OC_{lag}(t)$ is the calculated lag for the measured operational characteristic at time t;

$OC_{lag}(t-1)$ is the calculated lag for the measured operational characteristic at time t−1;

$OC_{measured}(t-1)$ is the measured operational characteristic at time t−1;

Δt is the difference between the first time and the second time; and $\tau_{OC}$ is the time constant of the measured operational characteristic.

9. The computer-readable medium of claim 8, wherein the program code causes the at least one computing device to detect the thermal stability within the gas turbine system by performing further processes including:

verifying that the gas turbine system is thermally stable in response to each of the calculated lag outputs for each of the plurality of measured operational characteristics being below the corresponding predetermined threshold.

10. The computer-readable medium of claim 8, wherein the lag output for each of the plurality of measured operational characteristics of the gas turbine system is calculated based on:

$$O \cdot C_{lag} = \frac{\Delta OC_{lag}}{\tau_{OC}}$$

wherein:

$O_{lag}$ is the calculated lag output;

$\Delta OC_{lag}$ is the determined lag difference; and $\tau_{OC}$ is the time constant of the measured operational characteristic.

11. The computer-readable medium of claim 8, wherein the program code causes the at least one computing device to detect the thermal stability within the gas turbine system by performing further processes including:

calculating the predetermined threshold for each of the plurality of measured operational characteristics based on an operational model of the gas turbine system, the operational model of the gas turbine system includes identical build parameters as the build parameters of the gas turbine system.

12. A method for detecting thermal stability within a gas turbine system, the gas turbine system including a compressor, a combustor, and a turbine component, the method comprising:

calculating a lag output for each of a plurality of measured operational characteristics of the gas turbine system measured by a plurality of sensors positioned at least one of within or adjacent the gas turbine system, the calculated lag output based on:

a difference between a calculated lag for the measured operational characteristics of the gas turbine system and the measured operational characteristic, and a time constant for each of the plurality of measured operational characteristics; and determining when each of the calculated lag outputs are below a predetermined threshold, the predetermined threshold based on each of the plurality of measured operational characteristics and build parameters of the gas turbine system, wherein the build parameters include at least one of:

a) at least one of a type, size, and model of the compressor;

b) at least one of a type, size, and model of the combustor; and c) at least one of a type, size, and model of the turbine component, wherein the lag for each of the plurality of measured operational characteristics of the gas turbine system is calculated based on:

$$\left(\frac{\Delta t}{\tau_{OC}}\right)$$

wherein:

t is a first time;

t−1 is a second time occurring prior to the first time t;

$OC_{lag}(t)$ is the calculated lag for the measured operational characteristic at time t;

$OC_{lag}(t-1)$ is the calculated lag for the measured operational characteristic at time t−1;

$OC_{measured}(t-1)$ is the measured operational characteristic at time t−1;

Δt is the difference between the first time and the second time; and $\tau_{OC}$ is the time constant of the measured operational characteristic.

13. The method of claim 12, further comprising:

verifying that the gas turbine system is thermally stable in response to each of the calculated lag outputs for each of the plurality of measured operational characteristics being below the corresponding predetermined threshold.

14. The method of claim 12, further comprising:
in response to determining each of the calculated lag outputs are below the corresponding predetermined threshold, adjusting operational conditions of the gas turbine system to increase a power output for the gas turbine system.

15. The method of claim 12, further comprising:
calculating the predetermined threshold for each of the plurality of measured operational characteristics based on an operational model of the gas turbine system, the operational model of the gas turbine system includes identical build parameters as the build parameters of the gas turbine system.

16. The method of claim 15, wherein the time constant is specific to each of the plurality of measured operational characteristics and the build parameters for the gas turbine system.

17. The method of claim 13, wherein the lag output for each of the plurality of measured operational characteristics of the gas turbine system is calculated based on:

$$O\_C_{lag} = \frac{\Delta OC_{lag}}{\tau_{OC}}$$

wherein:

$O\_C_{lag}$ is the calculated lag output;

$\Delta OC_{lag}$ is the determined lag difference; and $\tau_{OC}$ is the time constant of the measured operational characteristic.

* * * * *

UNITED STATES PATENT AND TRADEMARK OFFICE
CERTIFICATE OF CORRECTION

PATENT NO. : 11,585,234 B2
APPLICATION NO. : 16/809134
DATED : February 21, 2023
INVENTOR(S) : Muthaiah et al.

It is certified that error appears in the above-identified patent and that said Letters Patent is hereby corrected as shown below:

In the Claims

Claim 1 is missing part of the equation after Column 17, Line 53. It should be:

$$OC_{lag}(t) = OC_{lag}(t-1) + (OC_{measured}(t-1) - OC_{lag}(t-1))(1-e^{(\frac{\Delta t}{\tau_{OC}})})$$

Claim 8 is missing part of the equation after Column 19, Line 30. It should be:

$$OC_{lag}(t) = OC_{lag}(t-1) + (OC_{measured}(t-1) - OC_{lag}(t-1))(1-e^{(\frac{\Delta t}{\tau_{OC}})})$$

Claim 12 is missing part of the equation after Column 20, Line 46. It should be:

$$OC_{lag}(t) = OC_{lag}(t-1) + (OC_{measured}(t-1) - OC_{lag}(t-1))(1-e^{(\frac{\Delta t}{\tau_{OC}})})$$

Signed and Sealed this
Ninth Day of May, 2023

*Katherine Kelly Vidal*
Katherine Kelly Vidal
*Director of the United States Patent and Trademark Office*